May 19, 1970
M. M. SPANN
3,513,379
REMOTE VOLTAGE REGULATOR SYSTEM
Filed July 18, 1968
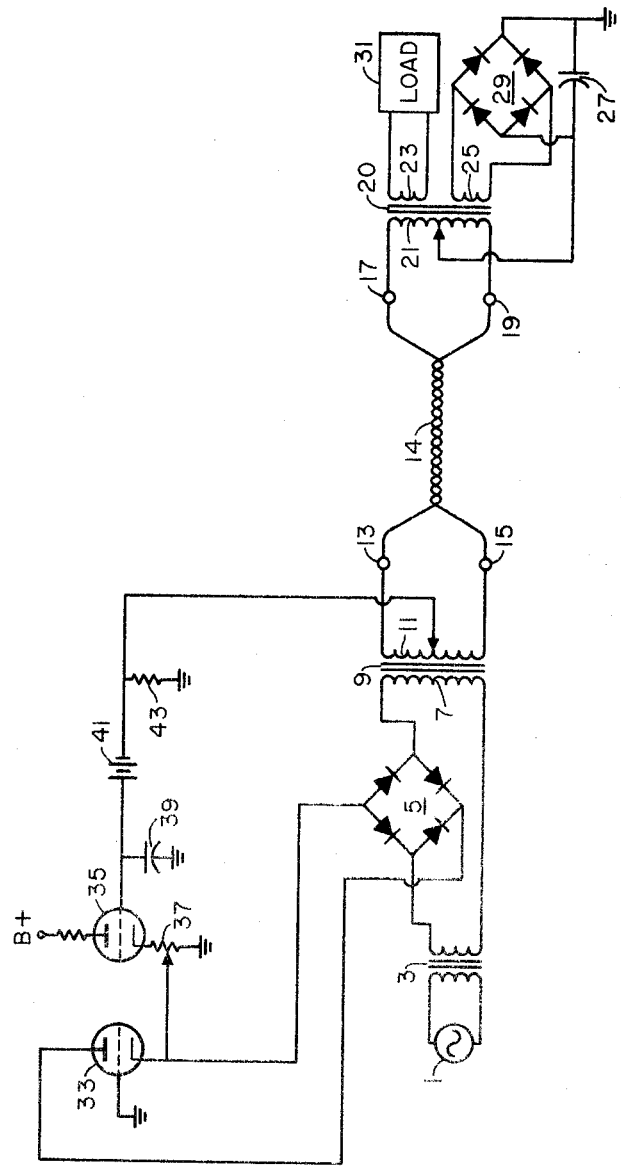
MICHAEL M. SPANN INVENTOR.
BY John B Davidson
ATTORNEY

United States Patent Office 3,513,379
Patented May 19, 1970

---

3,513,379
REMOTE VOLTAGE REGULATOR SYSTEM
Michael M. Spann, Houston, Tex., assignor to Esso Production Research Company, a corporation of Delaware
Filed July 18, 1968, Ser. No. 745,853
Int. Cl. G05f 3/04, 13/04
U.S. Cl. 323—16
4 Claims

ABSTRACT OF THE DISCLOSURE

Apparatus for regulating a voltage at a remote, relatively inaccessible location includes a transformer with a center-tapped secondary, a second transformer with a center-tapped primary, rectifier bridge for applying the output voltage of the second transformer between the center tap and ground, apparatus for measuring the voltage reflected between the center-tapped secondary and ground, and a vacuum tube circuit for varying an impedance in the primary circuit of the first transformer to compensate for voltage variations between the center-tapped primary and ground.

BACKGROUND OF THE INVENTION

This invention relates generally to voltage regulation and more particularly to the regulation of a voltage at a remote, relatively inaccessible location.

In connection with the radiation logging of boreholes, there exists a need for maintaining a regulated voltage in a logging sonde that may be lowered into a borehole at the end of up to 20,000 feet of logging cable for energizing a photomultiplier tube that detects radioactive emissions. Logging cables are notoriously lossy and are very poor conductors of electrical signals. Varying power demands of downhole logging equipment can result in a considerable change in voltage which tends to decrease the accuracy of measurements made with the logging equipment. Voltage regulating apparatus described in the prior art, such as that shown in U.S. Pat. 2,592,615, Stone, are not suitable for regulating voltage applied to well logging equipment in a borehole when the primary power supply is located at the earth's surface.

SUMMARY OF THE INVENTION

In accordance with the teachings of the present invention, there is provided first transformer means having a center tapped secondary winding and a second transformer means having a pair of secondary windings and a center tapped primary winding. One of the secondary windings of the second transformer means is connected to a load, and the other is connected to a first bridge rectifier means, the output of the bridge rectifier means being connected between the center tap of the second transformer and ground. The power supply at the earth's surface is coupled to the primary of the first transformer means through a second bridge rectifier, this bridge rectifier being connected in series circuit relationship with the primary of the first transformer means so that the impedance in the secondary circuit of the second bridge rectifier will control the voltage applied to the first transformer means from the AC source. Between ground and the center tap of the first transformer means secondary winding there is connected circuit means for producing a signal indicative of the output voltage of the first bridge rectifier means. In the output of the second bridge rectifier means and connected to the circuit means aforesaid there is a variable impedance means, the impedance of which varies in accordance with the output signal of the second bridge rectifier means whereby the voltage applied to the first transformer means primary winding is varied oppositely to variations in voltage in the second transformer means secondary windings.

Objects and features of the invention not apparent from the above discussion will become evident upon consideration of the following detailed description of the invention when taken in connection with the accompanying drawing.

BRIEF DESCRIPTION OF THE DRAWING

In the drawing the sole figure is an electrical schematic diagram of a preferred form of the invention.

DESCRIPTION OF THE PREFERRED EMBODIMENTS

With reference now to the single figure there is illustrated a preferred form of the invention for regulating the voltage applied to a load 31 from a source 1. Power from the source 1 is transmitted to the load 31 through an isolating transformer 3, a first power transformer 9, a logging cable 14, and a second power transformer 20. The secondary winding of transformer 3 is coupled to the primary winding 7 of transformer 9 through a bridge rectifier 5. A variable impedance vacuum tube 33 in the output circuit of the bridge rectifier 5 functions to vary the voltage applied to the primary 7. The secondary winding 11 of transformer 9 is center-tapped, and the voltage between the center tap and ground is applied to a resistor 43. The DC voltage across the resistor 43 is coupled to the grid of a DC amplifier tube 35 through a battery 41 and a capacitor 39. The battery 41 is connected so that the voltage applied to the grid of tube 35 is the difference between the voltage across the resistor 43 and the voltage of battery 41. The output of the DC amplifier is taken from the tap of a potentiometer in the cathode circuit of tube 35, and is applied to the cathode of the variable resistance vacuum tube 33 which is connected in a grounded grid configuration. Thus the voltage appearing across resistor 43 controls the effective impedance presented by the variable resistance tube 33 to vary the effective impedance presented by bridge rectifier 5 to current in the primary circuit of transformer 9.

Logging cable 14 is connected between terminals 13 and 15 of the secondary winding 11 of transformer 9, and terminals 17 and 19 to which is connected the outer terminals of primary winding 21 of transformer 20. Transformer 20 has two secondary windings 23 and 25. Winding 23 is connected to the load 31 which may be the photomultiplier tube of a nuclear spectral logger. The other secondary winding 25 of transformer 20 is connected to the input of bridge rectifier 29, the output terminals of which are connected to the center tap of winding 21 and to ground. A capacitor 27 is connected across the output of bridge rectifier 29 for smoothing purposes to eliminate any ripple in the voltage produced thereby. As is well known in the art of telephony, any voltage appearing between the center tap of winding 21 and ground will also appear between the center tap of winding 11 and ground, the transformer being connected in what is known as a "phantom circuit." Thus the appearance of a DC voltage across the output of bridge rectifier 29 will produce a similar DC voltage across resistor 43.

The overall operation of the apparatus described above is as follows. Let it be assumed that alternating current source 1 is energized to supply power to the load 31. The tap on potentiometer 37 is adjusted until the voltage across transformer winding 23 is of an appropriate value. The output voltage appearing across bridge rectifier 29 will vary in the same sense as the voltage across winding 23 and will be reflected back through the phantom circuit to vary the voltage across resistor 43 and the voltage appearing across the entirety of potentiometer 37. When the system has stabilized the logging sonde containing transformer 20, bridge retifier 29, and apaitor 27 may be lowered into a well. Now let it be assumed that for some reason the load current changes. Inasmuch as the logging cable 14 is a device having relatively high resistance and reactance, this current change will produce a very large change in the voltage across windings 23 and 25. This voltage change will be reflected back through the phantom circuit to the earth's surface to vary the voltage across resistor 43. Any variation in the voltage across resistor 43 will vary the impedance offered to flow of current by the variable resistance tube 33. This variation of impedance is of a magnitude and sense to increase or decrease the voltage applied to winding 7 so as to compensate for the change in voltage appearing across windings 23 and 25. Thus the voltage applied to load 31 will remain constant in spite of large variations in current taken by the load 31.

The variable-resistance vacuum tube 33 may be a type 6080 such as is commercially available. Vacuum tube 35 may be a tape 12AY7 and battery 41 may be Eveready type E126.

Where the alternating current source 1 does not have one or the other of its terminals grounded, the transformer 3 may be eliminated. However, should one or other of the lines leading from source 1 be grounded, it would be found necessary to include the isolation transformer in the circuit.

The ratio of voltages across windings 23 and 25 may be in the order of 20 to 1. It will be found that a voltage at the output of bridge rectifier 29 of the order of 100 volts will be sufficient for control purposes when a voltage of 2000 volts is required by load 31. Transformer 9 is a step-up transformer and transformer 20 is a step-down transformer to minimize the magnitude of the electrical current that flows through the logging cable 14.

Although the embodiment described in the preceding specification is preferred, modifications will be apparent to those skilled in the art which do not depart from the scope of the broadest aspects of the invention.

I claim:

1. Voltage regulating apparatus for power transmission from an alternating current electrical source to a load at a remote location, comprising:
   first transformer means having a primary winding and a center-tapped secondary winding;
   second transformer means having second and third secondary windings and a center-tapped primary winding, said second secondary winding being for connection to the load;
   first bridge rectifier means having an input connected across said third secondary winding and an output connected between the center of said center-tapped primary winding and ground;
   transmission line means connected between the secondary winding of the first transformer means and the primary winding of the second transformer means;
   means including second bridge rectifier means for connecting the primary winding of said first transformer means to the alternating current source, said second bridge rectifier means being connected in series circuit relationship with said primary of said first transformer;
   circuit means connected between ground and the center-tapped said first transformer means secondary winding for producing a signal indicative of the output voltage of said first bridge rectifier means; and
   variable impedance means in the output of said second bridge rectifier means and connected to said circuit means, variable in impedance in accordance with the output signal of said second bridge rectifier means to vary the voltage applied to the first transformer means primary winding oppositely to variations in voltage in the second transformer means secondary windings.

2. The apparatus of claim 1 wherein an isolation transformer is interposed between the second bridge rectifier means and the alternating current source.

3. The apparatus of claim 1 wherein the transmission line means is a well logging cable.

4. The apparatus of claim 1 wherein the circuit means comprises a resistor connected between the center tap of the secondary of the first transformer means and ground and a direct current amplifier for amplifying the voltage appearing across said resistor.

References Cited

UNITED STATES PATENTS

| | | | |
|---|---|---|---|
| 3,028,528 | 4/1962 | Ghiselin | 323—44 X |
| 3,103,626 | 9/1963 | Burton et al. | 324—10 X |
| 3,105,190 | 9/1963 | Norris | 324—6 |

LEE T. HIX, Primary Examiner

G. GOLDBERG, Assistant Examiner

U.S. Cl. X.R.

323—57; 324—1; 307—149